United States Patent
Ghanathe et al.

(10) Patent No.: US 8,504,989 B2
(45) Date of Patent: Aug. 6, 2013

(54) SERVICE DEFINITION DOCUMENT FOR PROVIDING BLENDED SERVICES UTILIZING MULTIPLE SERVICE ENDPOINTS

(75) Inventors: Ravindra K. Ghanathe, Bangalore (IN); Subrahmanya R. Mruthyunjaya, Bangalore (IN); Rashmi Shenoy, Bangalore (IN)

(73) Assignee: Infosys Limited, Bangalore (IN)

( * ) Notice: Subject to any disclaimer, the term of this patent is extended or adjusted under 35 U.S.C. 154(b) by 177 days.

(21) Appl. No.: 13/109,826

(22) Filed: May 17, 2011

(65) Prior Publication Data
US 2012/0233595 A1   Sep. 13, 2012

(30) Foreign Application Priority Data

Mar. 10, 2011  (IN) .............................. 714/CHE/2011

(51) Int. Cl.
*G06F 15/16* (2006.01)
*G06F 15/173* (2006.01)
*G06F 17/00* (2006.01)
*G06F 17/28* (2006.01)
*G06F 9/44* (2006.01)
*G06F 3/00* (2006.01)

(52) U.S. Cl.
USPC ........... 717/123; 709/204; 709/223; 715/249; 717/104; 719/321

(58) Field of Classification Search
None
See application file for complete search history.

(56) References Cited

U.S. PATENT DOCUMENTS

| | | | |
|---|---|---|---|
| 5,802,159 A | 9/1998 | Smolentzov et al. | |
| 5,819,092 A | 10/1998 | Ferguson et al. | |
| 6,338,088 B1 | 1/2002 | Waters et al. | |
| 7,072,953 B1* | 7/2006 | Davutoglu | 709/223 |
| 7,207,048 B2 | 4/2007 | McQuillan et al. | |
| 7,340,507 B2 | 3/2008 | Tuunanen et al. | |
| 7,437,408 B2* | 10/2008 | Schwartz et al. | 709/204 |
| 7,634,726 B2* | 12/2009 | Ims et al. | 715/249 |
| 2002/0091533 A1* | 7/2002 | Ims et al. | 705/1 |
| 2003/0066028 A1* | 4/2003 | Payne et al. | 715/500 |

(Continued)

OTHER PUBLICATIONS

Chihping Wang et al., A Parallel Execution Method for Minimizing Distributed Query Response Time, 1992 IEEE, [Retrieved on May 5, 2013]. Retrieved from the internet: <URL: http://ieeexplore.ieee.org/stamp/stamp.jsp?tp=&arnumber=139206> 9 Pages (325-333).*

(Continued)

*Primary Examiner* — Don Wong
*Assistant Examiner* — Anibal Rivera
(74) *Attorney, Agent, or Firm* — Klarquist Sparkman, LLP

(57) ABSTRACT

A service definition document (SDD) framework is provided for defining blended services that utilize multiple service endpoints. The SDD framework can comprise a first category that defines a service endpoint representing a blended service, a second category that defines a plurality of service endpoints utilized by the blended service, and a third category that defines execution of the blended service. Blended services can be provided by creating a model of a blended service and saving a representation of the model of the blended service in a service definition document (SDD) framework. A blended service defined in a SDD framework can be executed by receiving the SDD and executing the blended service as defined by the SDD using a service execution environment (SEE).

18 Claims, 10 Drawing Sheets

U.S. PATENT DOCUMENTS

| | | |
|---|---|---|
| 2003/0139174 A1 | 7/2003 | Rao |
| 2007/0088837 A1 | 4/2007 | Gidron et al. |
| 2008/0120129 A1* | 5/2008 | Seubert et al. .................... 705/1 |
| 2009/0138625 A1* | 5/2009 | Lee et al. ...................... 719/321 |
| 2009/0210888 A1* | 8/2009 | Lee et al. ...................... 719/321 |
| 2011/0191748 A1* | 8/2011 | Kannan et al. ................ 717/104 |

OTHER PUBLICATIONS

Boualem Benatallah et al., The Self-Serv Environment for Web Services Composition, Jan.-Feb. 2003 IEEE, [Retrieved on May 5, 2013]. Retrieved from the internet: <URL: http://ieeexplore.ieee.org/stamp/stamp.jsp?tp=&arnumber=1167338> 9 Pages (40-48).*

* cited by examiner

SOFTWARE 980 FOR DESCRIBED
TECHNOLOGIES

US 8,504,989 B2

SERVICE DEFINITION DOCUMENT FOR PROVIDING BLENDED SERVICES UTILIZING MULTIPLE SERVICE ENDPOINTS

BACKGROUND

Developers are increasingly seeking new ways of using the various services available on networks such as the Internet. Service providers and other businesses (e.g., vertical businesses) publish software development kits and application programming interfaces for the services they provide so application developers can develop applications that utilize their services.

Currently, a developer can download a software development kit for using a service, such as a network service, from a specific service provider. Using the software development kit, the developer can develop a software application that uses the service from the service provider. Typically, the developer develops the software application locally and then transfers the software application to a sandbox (e.g., hosting or staging environment provided by the service provider) where the application can be tested. However, using such sandbox environments provided by the service provider can be difficult and time consuming for the developer. For example, the developer may have to register or pay to access the sandbox. Furthermore, the sandbox may not provide an interface that is as responsive or full-featured as the interface provided locally by the software development kit on the developer's machine. In addition, the sandbox may not provide sufficient or complete support for various testing needs, such as negative test scenarios.

In addition, software developers often desire to develop software applications that utilize multiple services provided by multiple different service providers or businesses. Currently, such a developer would have to use multiple different software development kits, one for each of the specific services the developer wants to use. Alternatively, such a developer would have to write code to separately access each of the services the developer wants to use.

Therefore, there exists ample opportunity for improvement in technologies related to providing a development and deployment environment within which a developer can easily and efficiently integrate information from different services provided by different service providers. This should ease the effort in developing blended applications that will create more value to end customers.

SUMMARY

A variety of technologies related to using service definition documents for defining blended services that integrate multiple service endpoints are applied.

For example, a service definition document (SDD) framework is provided for defining blended service software applications that utilize multiple service endpoints. The SDD framework comprises a first category of the SDD that defines a service endpoint representing a blended service, a second category of the SDD that defines a plurality of service endpoints utilized by the blended service, and a third category of the SDD that defines execution of the blended service.

As another example, a method is provided for defining blended service software applications that utilize multiple service endpoints. The method comprises creating, using a graphical blended service creation environment, a model of a blended service and saving, using the graphical blended service creation environment, a representation of the model of the blended service as a service definition document (SDD) framework. The SDD framework comprises a first category of the SDD that defines a service endpoint representing a blended service, a second category of the SDD that defines a plurality of service endpoints utilized by the blended service, and a third category of the SDD that defines execution of the blended service.

As another example, a method is provided for executing blended services defined by a service definition document (SDD) framework using a service execution environment (SEE). The method comprises receiving a service definition document, where the SDD defines a blended service, where the blended service integrates information from a plurality of service endpoints, and where the plurality of service endpoints are a plurality of different service endpoints provided by a plurality of different service providers, and executing the blended service as defined by the SDD. Executing the blended service comprises connecting to the plurality of service endpoints, where the plurality of service endpoints are located remotely, via a communication network, from the SEE.

In some implementations, the service definition document (SDD) framework is defined in an extensible markup language (XML) structure.

The foregoing and other features and advantages of the invention will become more apparent from the following detailed description, which proceeds with reference to the accompanying figures.

DETAILED DESCRIPTION OF EXEMPLARY EMBODIMENTS

The following description is directed to techniques and solutions for creating, testing, and deploying blended services that integrate multiple service endpoints. The various techniques and solutions can be used in combination or independently. Different embodiments can implement one or more of the described techniques and solutions.

Furthermore, the various techniques and solutions for creating, testing, and/or deploying blended services that integrate multiple service endpoints can be used by various types of users including software developers and other types of users, such as those without software-development or programming experience (e.g., third party vendors, business analysts, service designers, innovators, or anyone else who wants to develop such services).

I. Example Service Endpoint

In the techniques and solutions described herein, service endpoints refer to computing services (e.g., services that are provided, at least in part, via computing devices) provided by service providers. A service endpoint represents a specific computing service provided by a specific service provider. For example, a specific service endpoint can be an online map service (the computing service) provided by Company A (the service provider). Another example of a specific service endpoint is a conference calling service provided by Company B. Further examples of service endpoints include a service that provides GPS coordinates for a mobile device, a service that provides calendar/appointment scheduling, and a service that provides Short Message Service (SMS) communication.

Service endpoints are exposed by service providers to allow use of the service by outside users (e.g., individual users or other software/services). In some instances, a user or other service connects to the service endpoint over a network such as the Internet.

II. Example Blended Service Creation Environment

In the techniques and solutions described herein, a blended service creation environment is provided for developing blended services that utilize services provided by service endpoints. In a specific implementation, a blended service creation environment comprises a software development kit, a graphical service creation environment, and one or more service endpoint simulators. The blended service creation environment can also be implemented as, or comprise, an integrated development environment (IDE) platform. In another specific implementation, various components of the blended service creation environment (e.g., the graphical service creation environment and the service endpoint simulators) are built upon an existing IDE platform, such as the Eclipse™ IDE platform (Eclipse is a trademark of Eclipse Foundation, Inc.)

A blended service creation environment can be used to create blended services. For example, a business or other entity may want to create a blended service to realize new revenue streams.

Figure 1:
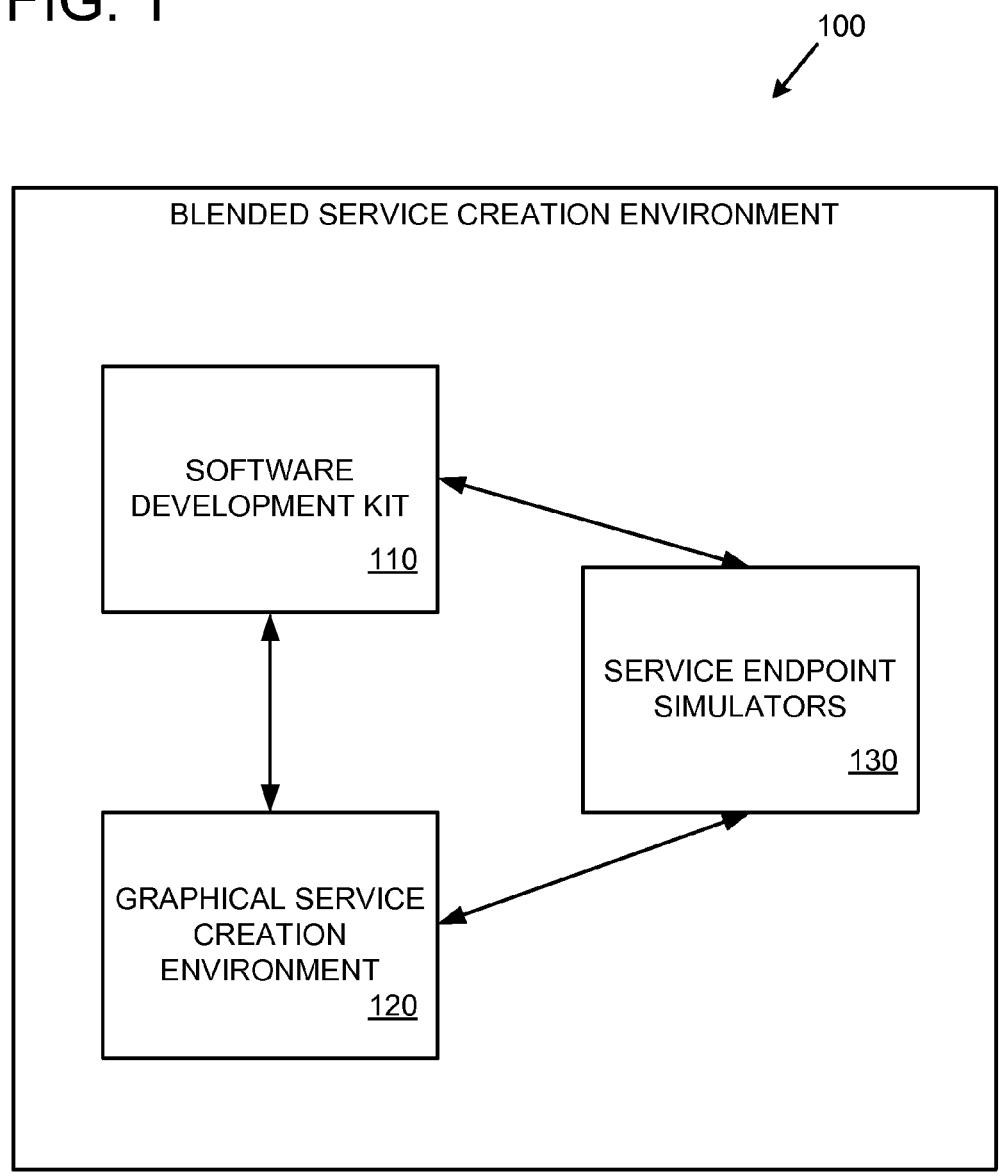
FIG. 1 is a block diagram depicting an example blended service creation environment.

FIG. 1 is a block diagram depicting an example blended service creation environment 100. The blended service creation environment 100 includes a software development kit 110. The software development kit 110 comprises application programming interfaces that support communication with a number of different service endpoints. Providing the software development kit 110 allows developers, or others using the blended service creation environment 100, to develop blended service software applications that utilize a number of different service endpoints without having to write code to access each individual service endpoint (e.g., other than calling a provided API).

The blended service creation environment 100 also includes a graphical service creation environment 120. The graphical service creation environment 120 provides graphical user interface tools allowing users to create blended service software applications that integrate various service endpoints. Using the graphical service creation environment 120, a user can use GUI tools to model blended services (e.g., via drag-n-drop widgets). Using the graphical service creation environment 120 allows developers, or other types of users such as people without specialized software development experience, with different skill levels to develop blended services. For example, a non-programmer can develop blended services by selecting GUI widgets representing various service endpoints, dragging desired widgets into the creation environment, connecting them together, and configuring various parameters to select information from service endpoints and combine/integrate the information to achieve the desired output. The graphical service creation environment 120 also supports programmer developers by providing access to a programming environment (e.g., Java, C++, etc.) for creating more complex solutions for integrating and processing the information obtained from the various service endpoints.

The blended service creation environment 100 also includes one or more service endpoint simulators 130. The service endpoint simulators 130 support simulation of various service endpoints. The service endpoint simulators 130 simulate the service endpoints locally, without the blended service creation environment 100 having to connect and communicate (e.g., via the Internet) with the actual service endpoints. The service endpoint simulators 130 can be configured (e.g., user configured) to simulate various test cases.

In some implementations, the service endpoint simulators 130 are implemented as independent software modules within the blended service creation environment 100. In a specific implementation, the independent software modules are servlets.

Using the service endpoint simulators 130, a user can develop a blended service that integrates a plurality of service endpoints and fully test the blended service locally with various test cases. When the user has finished building and testing the blended service, the user can deploy the blended service as a composite service (e.g., deploy the composite service using a service execution environment). Therefore, by using the blended service creation environment 100 with the service endpoint simulators 130, the user does not have to rely on a sandbox or staging area provided by the service providers.

In a specific implementation, the blended service creation environment 100 provides all the tools needed for the user to create and test blended services that utilize multiple service endpoints. The user does not have to download or use other tools, such as those provided by the multiple service endpoints. Everything the user needs to develop and test blended services is integrated into the blended service creation environment 100.

In a specific implementation, the blended service creation environment 100 also comprises a service execution engine, allowing users to develop and deploy services using one integrated environment.

III. Example Software Development Kit

In the techniques and solutions described herein, a software development kit (SDK) provides application programming interfaces (APIs) for developing software applications that utilize services provided by service endpoints. A software development kit can provide application programming interfaces for any number of programming languages (e.g., Java, C++, etc.). A software development kit can be provided as part of a blended service creation environment (e.g., blended service creation environment 100).

In a specific implementation, the software development kit abstracts out the underlying implementation details and other activities for accessing services provided by service endpoints. For example, the software development kit can abstract the task of generating client stubs for web services. The SDK also takes care of authentication, authorization, and other security requirements necessary before accessing service endpoints.

Figure 2:
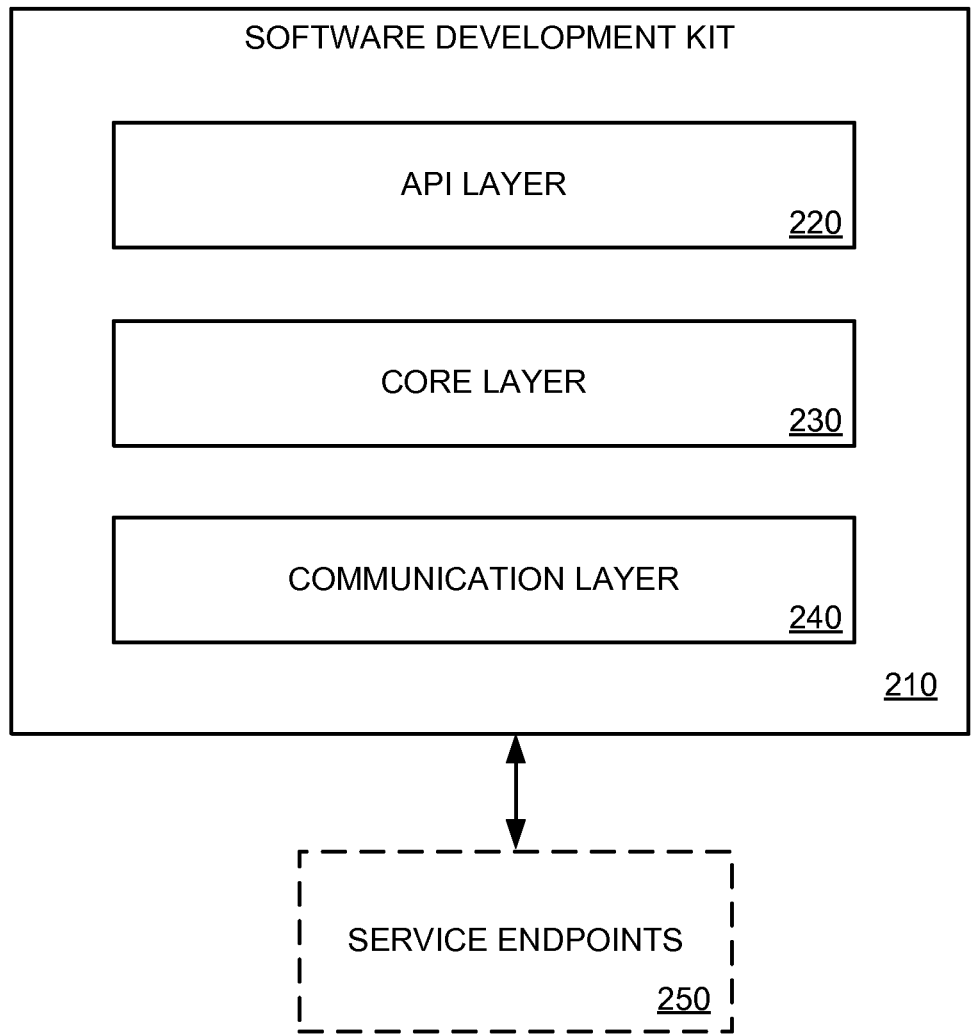
FIG. 2 is a block diagram depicting an example software development kit for developing blended services.

FIG. 2 is a block diagram depicting an example software development kit 210 for developing blended services. The software development kit 210 is implemented using a three layer architecture. The first layer of the software development kit 210 is the API layer 220. The API layer 220 exposes a set of APIs for use by developers in developing blended service software applications that utilize service endpoints (e.g., service endpoints 250).

In a specific implementation, the API layer 220 contains specialized packages with classes that can be instantiated and operations called through their public interfaces. The implementation of these classes makes use of the core layer 230 to realize the functionality or operations that the classes are exposing to the application programmer.

The second layer of the software development kit 210 is the core layer 230. The core layer 230 is the interface between the API layer 220 and the communication layer 240. The core layer 230 receives commands from the API layer 220, transforms those commands into appropriate calls for the specific service endpoints used, and uses the communication layer 240 to communicate with the service endpoints 250.

In a specific implementation, the core layer 230 contains three key components: specialized worker pools that contain worker classes (service access adapters) that perform service specific operations (e.g., each worker can be associated with its respective service endpoint), transformers that convert API inputs to out-bound formats for communication with the service endpoints, and a configuration manager that manages the configuration settings of the SDK, such as access to URLs/URIs (Uniform Resource Locator/Uniform Resource Identifier). The core layer 230 is also responsible for providing the respective worker from the worker pool for a given service endpoint. Well defined interfaces are used by the core layer 230 to facilitate future additions of worker pools and worker classes, and to add new service access capabilities through the SDK 210. The core layer 230 provides for both synchronous and asynchronous communication with the service endpoints. For enabling asynchronous communication the SDK 210 uses the observer/notifier arrangement which provides notification when a response is received.

The third layer of the software development kit 210 is the communication layer 240. The communication layer 240 includes communication functionality for communicating with various service endpoints 250 when the blended service software application is executed or run (e.g., using a service execution environment).

In a specific implementation, the communication layer 240 is responsible for providing interfaces for communicating with the service endpoints 250. For example, the service endpoints 250 can use a RESTful (Representational State Transfer) HTTP/s (Hypertext Transfer Protocol) connection or a protocol endpoint such as SMPP (Short Message Peer-to-Peer). The communication layer 240 defines the interfaces and protocol adapters needed for such communication and makes them pluggable into the SDK 210 framework.

In a specific implementation, a developer uses the APIs provided by the API layer 220 to perform the following operations:

1. Load a configuration for the SDK using a configuration manager interface
2. Instantiate the SDK using the loaded configuration
3. Obtain a specialized worker object for the particular service endpoint from the worker pool
4. Perform an operation using the worker object IV. Example Graphical Service Creation Environment In the techniques and solutions described herein, a graphical service creation environment (SCE) provides a graphical development environment for developing blended services (e.g., software applications) that utilize various service endpoints. A service creation environment can be provided as part of a blended service creation environment (e.g., blended service creation environment 100).

In a specific implementation, the service creation environment includes graphical user interface (GUI) tools providing drag and drop functionality. The service creation environment also includes the capability to define and model service endpoint functionality, validate operation, re-use services, etc. For example, the SCE enables users to model composite services with the aid of GUI-based modeling components by dragging and dropping widgets representing actual services (e.g., in a visual programming environment).

Once a blended service has been created within a graphical service creation environment, it can be exported or saved as a service definition document. The service definition document can be read into the SCE later and used to modify the blended service. The service definition document can also be used by a service execution environment to execute (run) the blended service. The service definition document can also be registered with a service repository, which provides storage and version control functions. In some implementations, the service repository is remotely hosted and is accessed over the Internet from the SCE.

Using the graphical service creation environment, a user can create a new blended service (e.g., a composite or mashed-up service) that combines functionality from multiple existing service endpoints provided by different service providers (e.g., third parties). In some implementations, the user is not required to have any specific programming language knowledge as the SCE provides graphical drag-and-drop widgets for the various service endpoints. All the user has to do is use the GUI widgets to define the new blended service, set various properties and attributes, save the blended service as a SDD, and run the new service on the SEE.

Figure 3:
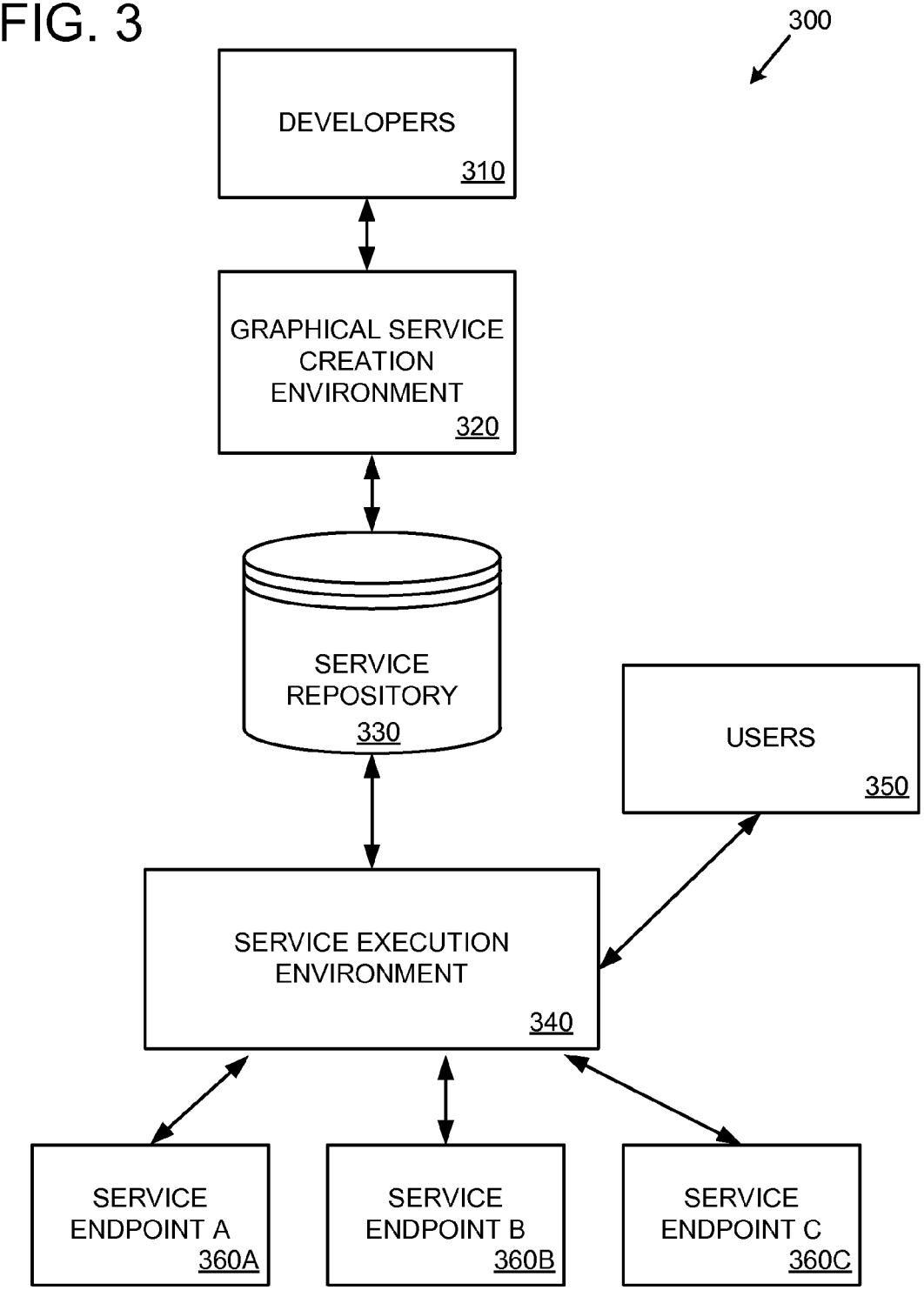
FIG. 3 is a block diagram depicting an example service creation environment for creating and deploying blended services.

FIG. 3 is a block diagram depicting an example service creation environment for creating and deploying blended services. In the example diagram 300, developers 310 use the graphical service creation environment 320 to develop blended service software applications.

Once blended services have been developed using the graphical service creation environment 320, they can be stored in the service repository 330. For example, the blended services can be stored in the service repository 330 as service definition documents. The service repository 330 stores the blended services, provides version control, and provides blended services to the service execution environment 340. Alternatively, blended services can be provided (e.g., as service definition documents) directly from the graphical service creation environment 320 to the service execution environment 340.

In order to execute or run the blended services, they are sent to the service execution environment 340. For example, the service execution environment 340 can obtain the blended services as service definition documents from the service repository 330. The service execution environment 340 executes the blended services, which can then be accessed by end users 350. For example, users 350 can access the blended services running on the service execution environment 340 over a network, such as the Internet. Various types of users 350 can access the blended services, such as mobile device users (e.g., using smart phones), desktop computer users, laptop/notebook computer users, etc. In a specific implementation, user devices run an application, or other code, allowing the user device to access the blended services running on the service execution environment 340.

During execution of the blended services, the service execution environment 340 facilitates communication between the blended services and service endpoints (e.g., service endpoint 360A-C) utilized by the blended services. In a specific implementation, the service execution environment 340 comprises a number of service endpoint adapters, with each service endpoint adapter configured for communicating with a specific one of the service endpoints (e.g., a specific service endpoint adapter configured for sending and receiving information from service endpoint A, 360A).

V. Example Service Definition Document

In the techniques and solutions described herein, a service definition document (SDD) contains sufficient information for describing the operation of blended services and for executing (e.g., running) such blended services. For example, a service definition document can be created by a graphical service creation environment.

In a specific implementation, the service definition document is an XML-based file created by the service creation environment. The service definition document contains the definition of a blended service created by a user of the service creation environment. The service definition document is used to regenerate the graphical user interface (GUI) model of the blended service within the service creation environment. The service definition document is also used by the service execution environment to execute the blended service.

In a specific implementation, the service definition document is built on object modeling principles to represent services, attributes of services, sequencing information, type of flow (e.g., parallel, sequential, timed), service type (e.g., synchronous or asynchronous), etc. The SDD also defines the order in which multiple services are executed, the information sent/received/processed at various states, failure points, etc.

Figure 4:
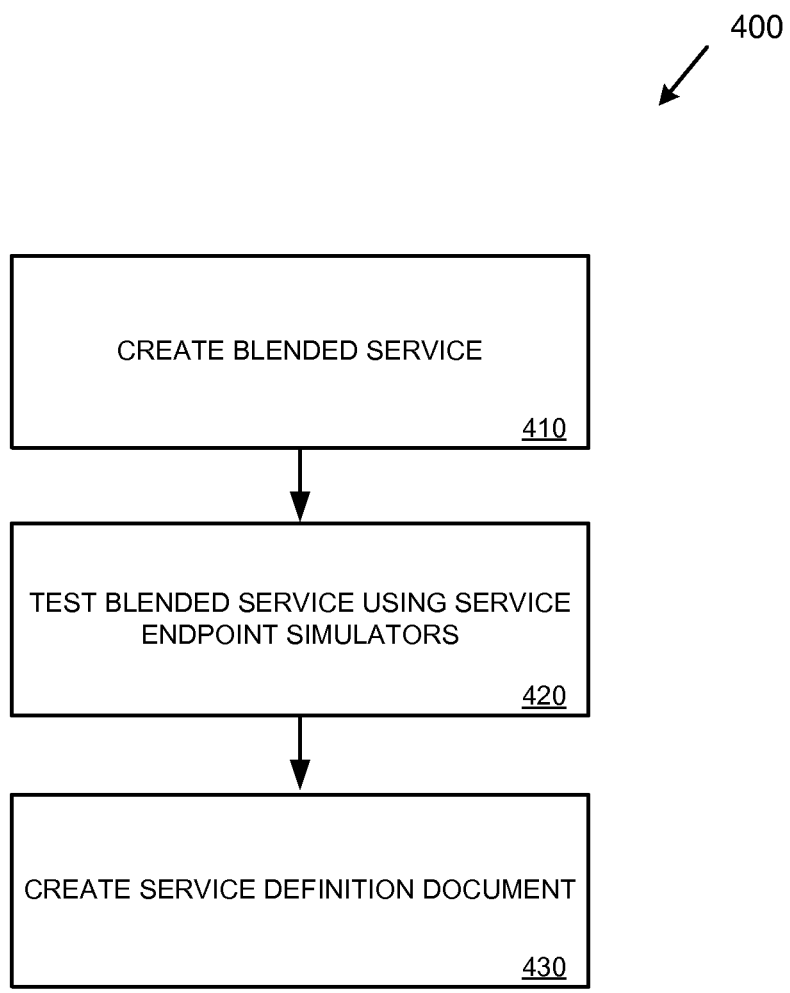
FIG. 4 is a flowchart showing an example method for creating blended services.

FIG. 4 is a flowchart showing an example method for creating service definition documents defining blended services. At 410, a blended service is created. The blended service integrates information from a plurality of service endpoints. For example, the blended service can be created using a graphical service creation environment.

At 420, the blended service is tested using one or more service endpoint simulators. The service endpoint simulators locally simulate (e.g., within a blended service creation environment) operation of the plurality of service endpoints.

At 430, a service definition document is created. The service definition document defines operation of the blended service. The service definition document can be used later to edit or modify the blended service (e.g., by reading the service definition document into the graphical service creation environment). The service definition document can also be used to execute the blended service (e.g., using a service execution environment).

The service definition document contains sufficient information to define operation of a blended service. For example, the SDD provides a framework for representing services, attributes of services, sequencing information, type of flow (e.g., parallel, sequential, timed), service type (e.g., synchronous or asynchronous), etc. The SDD framework also defines the order in which multiple services are executed, the information sent/received/processed at various states, failure points, etc.

The SDD framework can be defined and stored using different document structures. For example, the SDD can be defined in a markup language (e.g., in extensible markup language (XML) and stored in a file. The SDD can also be stored in a binary file, or any other type of document structure.

In a specific implementation, the SDD framework contains three general categories or sections of information, as follows.
1. The first category of SDD information defines the service endpoint representing the blended service being created by the SDD. For example, the blended service endpoint definition can include input parameters and output parameters (e.g., data received from users of the blended service endpoint and data sent to users of the blended service endpoint).
2. The second category of SDD information defines the specific service endpoints utilized by the created blended service. For example, the definition of the utilized service endpoints can include input/output information, worker class information, and sequence flow information. The specific service endpoints utilized can be primary service endpoints or blended services.
3. The third category of SDD information defines the execution of the created blended service endpoint, including execution of the service endpoints utilized in the created blended service. For example, the definition can include service execution order, parallel execution information, join information, etc.

The SDD format is scalable. For example, the SDD format can be used to define a blended service that utilizes multiple primary and/or blended service endpoints. The created blended service can itself be utilized by another blended service. This provides flexibility and promotes re-use of blended services within other (e.g., larger) blended service environments.

The SDD can also be used to deploy the blended service endpoint defined by the SDD. For example, the SDD can be deployed via a service execution environment (e.g., as described below with reference to FIG. 7). Once deployed, the blended service endpoint is available for use as a new service.

The SDD can be used to develop a client-side application. For example, the blended service defined by the SDD can be executed as an application (without being deployed).

Execution of the blended service using the SDD involves orchestration. In a specific implementation, adapters are used to communicate with each service endpoint utilized by the blended service. For example, a service execution environment can utilize adapters provided by SDKs by incorporating the SDKs into the service execution environment. Adapters can also be obtained from an external source, such as from a service provider (e.g., service owner) of the utilized service endpoint.

Execution of the blended service using the SDD can also involve the use of transformers. Transformers assist with converting data (e.g., data types or data formats) from one service to another service (e.g., transforming data output from a first service into a format compatible for input to a second service). For example, if Service A outputs a string of numbers and Service B (which will receive the output of Service A) needs a numeric input, then a transformer can be used that converts the string output of Service A into a numeric data type for input to Service B.

Figure 10:
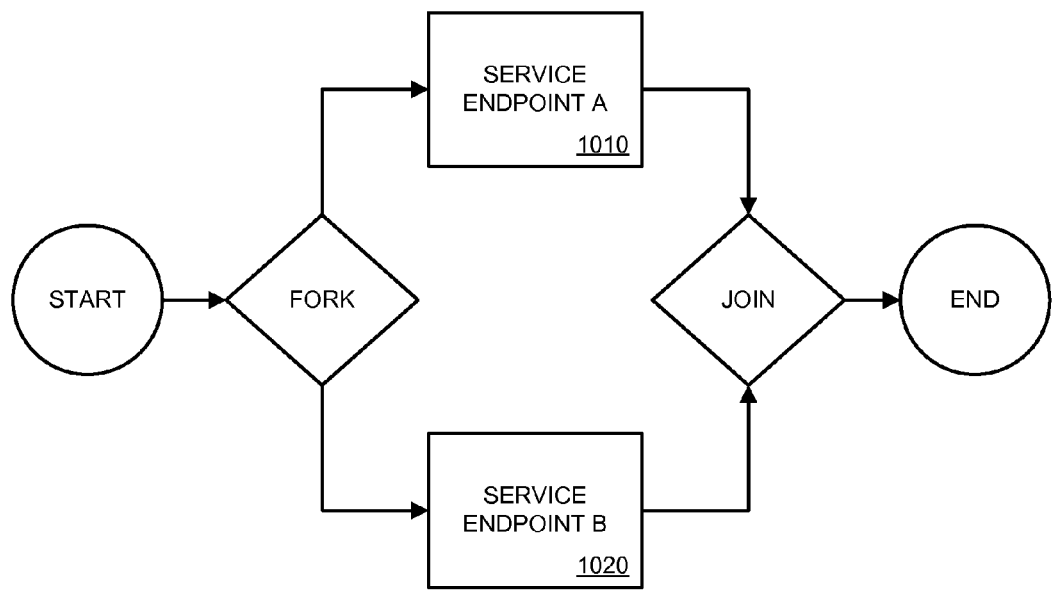
FIG. 10 is a block diagram depicting an example blended service model.

FIG. 10 is a block diagram depicting an example blended service model 1000. The example blended service model 1000 can be created with, and depicted via, the graphical service creation environment of FIG. 3.

The example blended service model 1000 depicts the flow of the blended service from the start state to a fork. From the fork, two service endpoints are utilized in parallel, service endpoint A 1010 and service endpoint B 1020. Service endpoint A 1010 could be a primary service endpoint or a blended service, as could service endpoint B 1020. While two services are depicted in this example, in general any number of service endpoints can be utilized within the blended service model 1000.

After processing of the service endpoints A and B (1010 and 1020) is complete, control flow is joined and control flow of the example blended service model 1000 proceeds to the end state.

Within a graphical service creation environment, the blended service model 1000 can be displayed and various parameters and configuration options set. For example, a service endpoint utilized by the blended service (e.g., 1010) can be selected and various parameters and configuration options set (e.g., input parameters, output parameters, worker classes, etc.). Similarly, the join state can be selected and other types of parameters can be set (e.g., receiving output from the utilized service endpoints, processing the received output, and generating results for a user of the blended service).

Below is an example SDD in an XML format according to a specific implementation. In the example XML SDD document below, a blended service is defined (LocationBasedServicebyEmail). The blended service utilizes two service endpoints. The first utilized service endpoint is a blended service (LocationBasedService), which in the example below is simulated by a service endpoint simulator. The second utilized service endpoint is a primary (basic) service (sendMail).

```
<?xml version="1.0" encoding="UTF-8"?>
<definitions id="definitions"
    xmlns="URL"
    xmlns:xsi="URL"
    targetNamespace="URL">
```

<-- In this example, a blended service is created and defined which performs the following:

a. Location Based Service (LBS) is invoked using the SDK APIs, This service requires the users MSISDN number as the input and it will return a LBSResponse object which will have information about the MSISDN's latitude and longitude. The SDK APIs obtain the location information through an interface to the LBS Simulator.

b. Once the LBS service is executed, the information provided by its output object (latitude and longitude) are sent to the subscriber's email id.

c. (a) and (b) are used together to create the blended service namely 'LocationBasedServicebyEmail' which takes the MSISDN and subscriber's email id as input and the output is a mail received by the subscriber and the LBSResponse object. For illustration purposes, the id/name of I/O objects are kept the same. -->

```
<process
    id="LocationBasedServicebyEmail">
<!--The service properties/configuration can be defined as displayed below (the service
QoS parameters such as repsonseTime, availability, etc., are defined here) -->
        <dataObject id="responseTime" itemSubjectRef="EmailDelivery" />
        <dataObject id="availability" itemSubjectRef="SimulatorData" />
        <!-- These are the service parameters required to operate this service -->
        <ioSpecification>
            <dataInput
                itemSubjectRef="LBSServiceByEmail"
                id="LBSServiceByEmail" />
            <inputSet>
                <dataInputRefs>UserMSISDN</dataInputRefs>
                <dataInputRefs>SubscriberEmailID</dataInputRefs>
            </inputSet>
            <outputSet>
                <dataInputRefs>LBSResponse</dataInputRefs>
            </outputSet>
        </ioSpecification>
        <startEvent id="StartLBSbyMail"></startEvent>
        <!-- Services -->
        <!-- Service (1) : Get location Service -->
        <!-- The GetLocation Service is using the LBSWorker class provided by
the SDK and internally invoking its API getLocationService( ) by passing the service
parameter MSISDN -->
            <!-- LBS is depicted as a subprocess task only to indicate that any
readily available service (both basic and blended) can be reused in this format. In this
specific example, this subprocess is invoking only one service. In other scenarios, it
could invoke one or more primary and/or blended services. -->
        <subprocess
            id="LocationBasedService" name="LBS">
            <startEvent id="StartLBS">
            <ioSpecification>
                <dataInput
                    itemSubjectRef="MSISDN" id="MSISDN" />
                <dataOutput
                    itemSubjectRef="LBSOutput"
                    id="LBSOutput" />
                <!-- The data Input/output associations
                    define the mapping between the object
                    provided to the service and the actual
                    representation of it in the service -->
                <dataInputAssociation>
                    <sourceRef>UserMSISDN</sourceRef>
                    <targetRef>MSISDN</targetRef>
```

```xml
                </dataInputAssociation>
                <dataOutputAssociation>
                    <sourceRef>LBSOutput</sourceRef>
                    <targetRef>LBSResponse</targetRef>
                </dataOutputAssociation>
            </ioSpecification>
        </startEvent>
        <serviceTask
            id="getLocationService"
                name="Location Based Services"
            class="SDKLBSWorkerClass"></serviceTask>
<!--The SDKLBSWorkerClass invokes the interface to the LBS Simulator and obtains
the location based results for the provided MSISDN (see 'Interface to the Simulator'
below for the interface definition) -->
        <endEvent id="EndLBS"
            name="EndLBS"></endEvent>
        <sequenceFlow id="f1"
            sourceRef="StartLBS" targetRef="getLocationService" />
        <sequenceFlow id="f2"
            sourceRef="getLocationService"
            targetRef="EndLBS" />
    </subprocess>
    <!-- Service (2): Email Service -->
    <!-- This is a primary Email service. This service is available as a web
service and is hence invoked by a web service client SendMailWSWSClient -->
    <serviceTask id="sendMail"
        name="Send LBS info by Email"
        class="SendMailWSWSClient">
        <ioSpecification>
            <dataInput
                itemSubjectRef="MailLocation"
                id="MailLocation" />
            <inputSet>
                <dataInputRefs>EmailId</dataInputRefs>
            </inputSet>
            <outputSet>
                <dataInputRefs>EmailResponse</dataInputRefs>
            </outputSet>
        </ioSpecification>
        <dataInputAssociation>
            <sourceRef>SubscriberEmailID</sourceRef>
            <targetRef>EmailId</targetRef>
    </serviceTask>
    <endEvent id="EndLBSbyEmail"
        name="EndLBSbyEmail"></endEvent>
<!-- The sequence flows are controlled by gateways. The gateways could be
conditional, timer based, event based, etc. -->
    <parallelGateway
        id="fork" /> <!-- diverge/branches the sequence flow control -->
    <parallelGateway
        id="join" /> <!-- converges/merges the sequence flow control -->
    <itemDefinition
        id="EmailDelivery" isCollection="false"
        itemKind="Information"
        structureRef="com.company.EmailDelivery" />
    <itemDefinition
        id="SimulatorData" isCollection="false"
        itemKind="Physical"
        structureRef="com.company.SimulatorData" />
    <!-- Interface to the Simulator -->
<!-- the output of the Location Based Service (LBSResponse) is populated through this
interface to the LBSSimulator -->
    <itemDefinition
        id="LBSResponse" isCollection="false"
        itemKind="Information"
        structureRef="com.company.LBSClient"
        import="http://readfromesbregistry/registry/LBSSimulator" />
    <!-- Interface to the Email web-service -->
<!-- the output of the SendMail service (EmailResponse) is populated by this web
service client interface which invokes the Email web service available on the web -->
    <itemDefinition
        id="EmailResponse" isCollection="false"
        itemKind="Information"
        structureRef="com.company.EmailWSClient"
        import="http://readfromesbregistry/registry/email.wsdl?" />
    <sequenceFlow id="flow1"
        sourceRef="StartLBSbyMail"
        targetRef="fork" />
    <sequenceFlow id="flow2"
        sourceRef="fork" targetRef="LocationBasedService" />
```

```
        <sequenceFlow id="flow3"
            sourceRef="fork" targetRef="sendMail" />
        <sequenceFlow id="flow4"
            sourceRef="LocationBasedService"
            targetRef="join" />
        <sequenceFlow id="flow5"
            sourceRef="sendMail" targetRef="join" />
        <sequenceFlow id="flow6"
            sourceRef="join" targetRef="EndLBSbyEmail" />
    </process>
</definitions>
```

Figure 7:
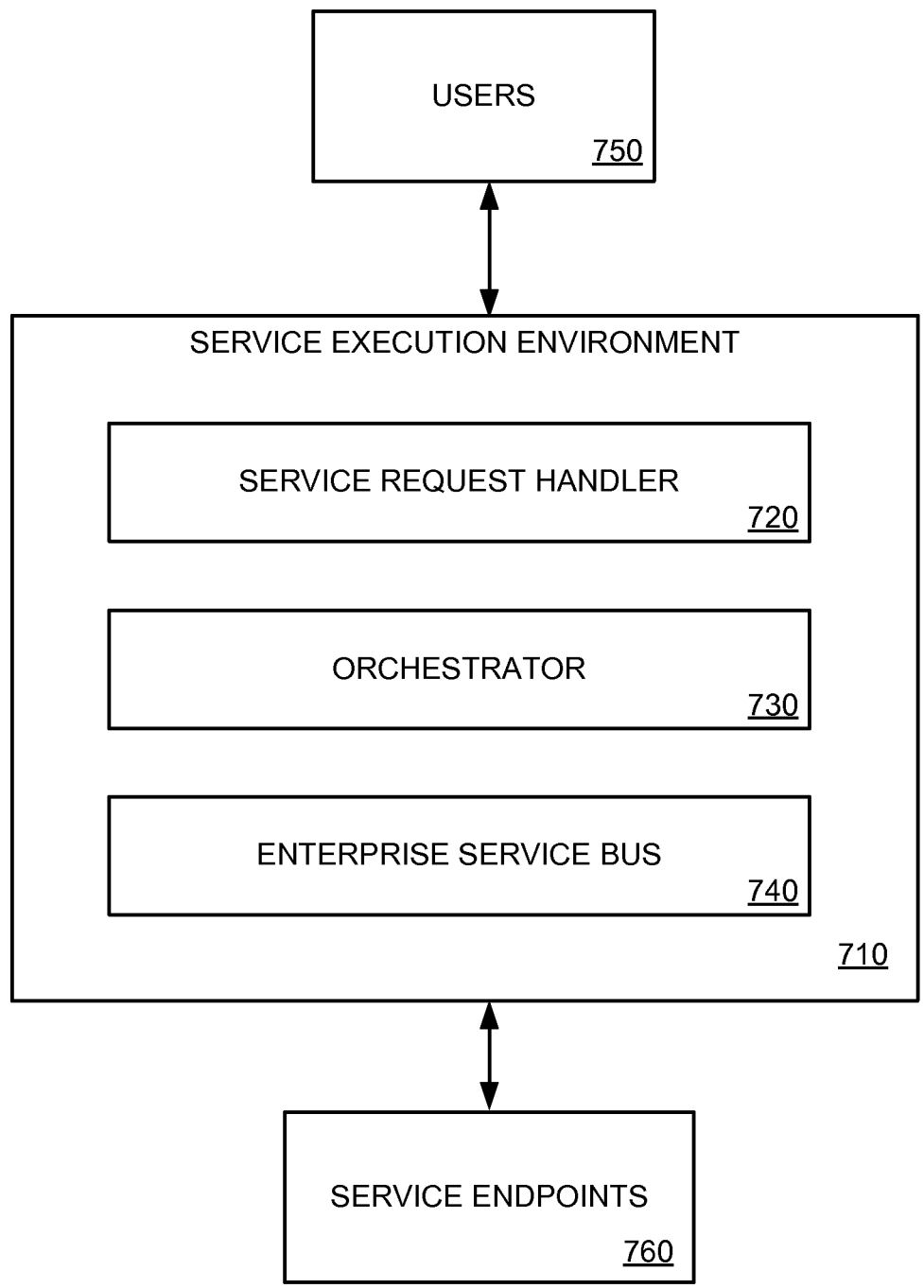
FIG. 7 is a block diagram depicting an example service execution environment for executing blended services.

An example of the execution of the above example XML SDD is as follows. First, a user accesses the blended service (LocationBasedServicebyEmail). For example, the blended service could be hosted on the web using a service execution environment (e.g., as depicted in FIG. 7). The user could access the blended service using an application running on the user's mobile device (e.g., mobile phone, tablet computer, etc.). The blended service obtains the user's device MSISDN and the user's email address.

Next, the LocationBasedService service is executed (e.g., by the service execution environment), which takes as input the user's MSISDN (the user's unique mobile device identifier) and returns the LBSResponse object which includes the location of the user's mobile device (e.g., latitude and longitude values, or other location-based information).

Next, the sendMail service is executed, which sends the location of the user's mobile device to the user's email address.

VI. Example Blended Service

In the techniques and solutions described herein, a blended service is a service that uses, at least in part, two or more service endpoints (e.g., third party service endpoints). A blended service is a composite service that utilizes (e.g., obtains information from) the two or more service endpoints. A blended service can be defined in terms of a service workflow. A blended service can be created by a graphical service creation environment. For example, a service creation environment can be used to develop a blended service that uses a plurality of service endpoints from remote and/or local service providers.

A blended service can be defined by a service definition document. For example the service definition document can store the operations of the blended service (e.g., as a state diagram). The service definition document can be used to execute or run the blended service using a service execution environment.

A blended service can be defined in terms of a state machine model. A state machine model is a useful modeling concept for defining blended services. In a specific implementation, the following components are used to represent and define blended services for composite services:

Start component—This component represents the start of a blended service.

Synchronous service component—Determines if the service represented by this component is a synchronous event/call.

Asynchronous service component—Determines if the service represented by this component is an asynchronous event/call.

Fork state component—This component represents a check point where the blended service process can be forked into more than one flow based on the number of parallel invocations that can occur.

Join state component—This component represents a check point where multiple blended service processes join into a single flow based on how and at which point a forked workflow can be joined.

Timer-wait component—This component triggers a timer-based event to invoke a service call, or any other specific operation that needs to be controlled by a timer-based event.

End component—This component represents the final state of the blended service.

In a specific implementation, a developer creates a blended service by downloading a blended service creation environment comprising a software development kit, service endpoint simulators, and graphical service creation environment. The developer creates blended service software applications using the blended service creation environment. The developer then tests the blended service software applications using the service endpoint simulators (e.g., by configuring the service endpoint simulators to test the blended services using various test cases). In order to deploy the blended services, the developer uploads them to a service provider that hosts a service execution environment.

In another implementation, a service execution environment can be provided for a developer to test blended services. In addition, third party vendors can use a service execution environment to deploy a blended service that uses a plurality of service endpoints.

VII. Example Service Repository

In the techniques and solutions described herein, a service repository can be used to store service definition documents for a community of SCE users. The service repository can include features comprising:

Storage of service definition documents

Version control of service definition documents

Maintenance of different states of service definition documents, including: ideation, modeling, validation, enabled, disabled, etc.

Authorization and privacy controls for accessing service definition documents

Search tools

Maintenance of a subscriber list for a given service, and capture of usage and performance information regarding service endpoints, service execution, and other related parameters via the SEE VIII. Example Service Endpoint Simulator In the techniques and solutions described herein, a service endpoint simulator (or a collection of service endpoint simulators) can be used to simulate a service endpoint (or a collection of service endpoints). A service endpoint simulator for a specific service endpoint simulates the behavior of the actual service endpoint, without requiring any connection to, or communication with, the actual service endpoint. In some implementations, one or more simulators are provided with the service creation environment or blended service creation environment allowing a user to develop blended services and test them with various service endpoints using the simulators. Because no connection to the actual service endpoint is necessary for such testing, the user can develop blended services locally in a self-contained development environment (e.g., the blended service creation environment).

Using the simulator, the user can configure test cases (e.g., positive or negative test cases) to test blended services. The user can configure the simulator to return information to simulate various operating conditions (e.g., extreme conditions) of the actual service endpoint. In a specific implementation, the user can specify a group of test cases in a comma delimited file and upload the file for automated testing.

For example, consider a service endpoint that provides calendar and appointment services. Using a simulator, a user could configure the simulator to return a specific appointment in response to a get-next-appointment service request. For example, the user could configure the simulator to return values such as: appointment date: Oct. 25, 2010, appointment time: 11:00 AM, appointment description: meeting with marketing team, appointment alert: 15 minutes prior.

Figure 5:
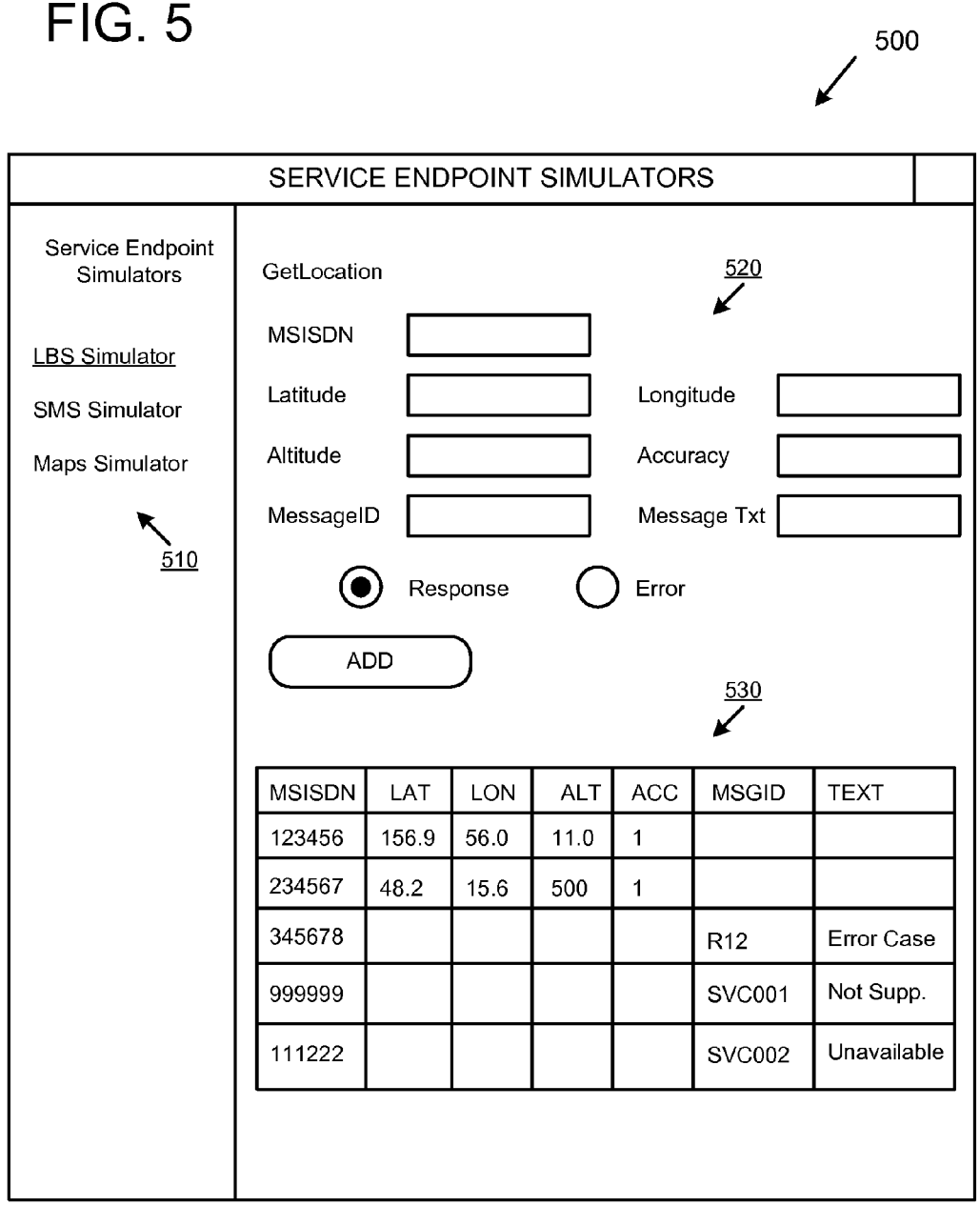
FIG. 5 is a diagram depicting an example configuration interface for service endpoint simulators.

FIG. 5 is a diagram depicting an example configuration interface 500 for service endpoint simulators. In the example interface 500, there is an area for selecting a specific service endpoint simulator to configure 510 (from the depicted service endpoint simulators comprising a location-based service (LBS) service endpoint simulator, an SMS service endpoint simulator, and a Maps service endpoint simulator). In the interface, the location-based service (LBS) simulator has been selected 510.

In the example interface 500, there is an area for configuring various settings and/or test cases 520. For the selected LBS service endpoint, the example interface displays an area for configuring test cases for the GetLocation operation of the LBS service endpoint 520. For example, a user can configure a test case that returns various values (including latitude, longitude, altitude, accuracy, etc.) for a specific mobile identifier (MSISDN). The user can also configure whether the result is a standard response or an error response. Once the user has entered the test case values, the user can create the test case using the "add" button.

The example interface 500 includes an area displaying entered test cases 530. The test cases depicted in the test case area 530 are example test cases for testing the LBS service endpoint.

For example, a user using a graphical service creation environment can create a blended service that uses the LBS service endpoint (that uses the GetLocation operation of the LBS service endpoint to obtain location information for mobile devices). The blended service can then be tested using the test cases created with the service endpoint simulator interface 500. For example, according to the first test case, the blended service can be tested by receiving, by the service endpoint simulator for the LBS service endpoint, a request from the blended service for the MSISDN "123456" and returning, by the service endpoint simulator for the LBS service endpoint, a response comprising "156.9" latitude, "56.0" longitude, "11.0" altitude, and "1" accuracy.

Using the service endpoint simulators interface 500, a developer of blended services can locally test multiple different service endpoints without having to actually communicate with the service endpoints. This also allows the developer to test extreme cases (e.g., a full range of possible values) and error conditions. Furthermore, in some implementations, the developer does not have to be connected to a network (e.g., the Internet) to perform such testing as the service endpoint simulators can run locally within the blended service creation environment.

The service endpoint simulators provide advantages over other implementations, such as sandbox environments. For example, a sandbox environment may not provide the testing functionality (e.g., error and negative test cases) to test a developed application.

Figure 6:
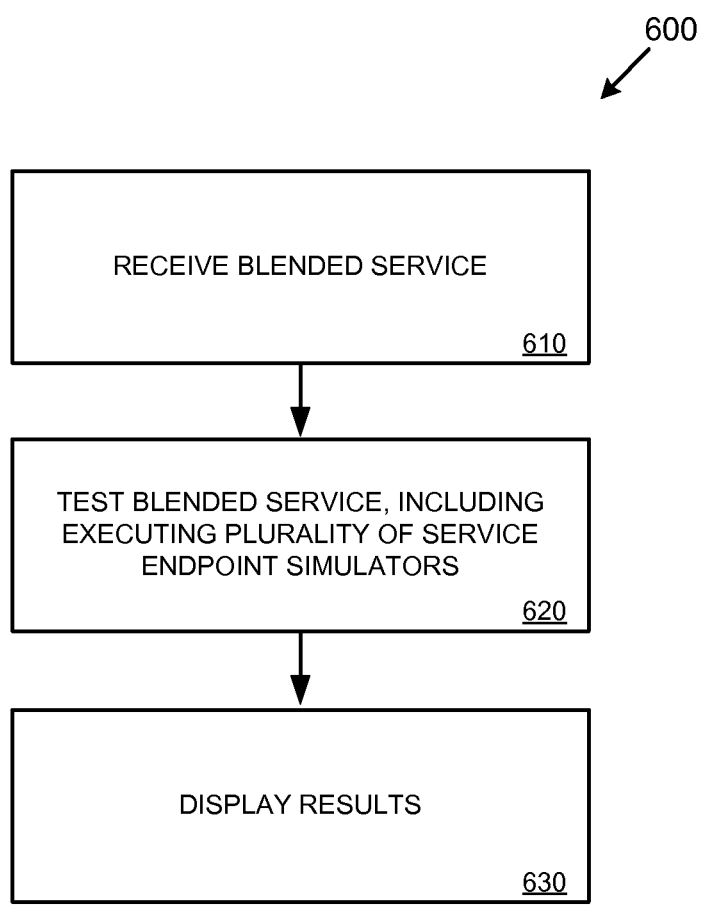
FIG. 6 is a flowchart showing an example method for testing blended services by simulating service endpoints with service endpoint simulators.

FIG. 6 is a flowchart showing an example method for testing blended services by simulating service endpoints with service endpoint simulators. At 610, a blended service is received. For example, the blended service can be received from within a blended service creation environment in the format of a service definition document.

At 620, the blended service is tested using a plurality of service endpoint simulators. The testing comprises executing the plurality of service endpoint simulators. The plurality of service endpoint simulators simulate communication with a corresponding plurality of actual service endpoints, without communicating with the actual service endpoints.

At 630, results of the testing of the blended service 620 are displayed. For example, results can comprise output from the blended service in response to communication with the service endpoint simulators. The results can comprise indications of whether the blended service responded correctly to various positive and/or negative test cases run by the service endpoint simulators.

IX. Example Service Execution Environment

In the techniques and solutions described herein, a service execution environment (SEE) is used to execute or run blended service software applications. The service execution environment handles communication with the various service endpoints utilized by the blended services. In addition, the service execution environment provides access to end users who want to utilize the blended services.

FIG. 7 is a block diagram depicting an example service execution environment 710 for executing blended services. The service execution environment 710 comprises a number of components, including a service request handler 720, an orchestrator 730, and an enterprise service bus 740.

The service request handler 720 acts as a gateway between users 750 and the blended service deployed on the SEE 710. For example, the service request handler 720 can handle communication with various types of users 750 (e.g., web clients, desktop software applications, mobile computing devices, etc.).

The orchestrator 730 executes or runs the blended service. In a specific implementation, the orchestrator 730 executes the blended service by running a service definition document defining the blended service.

The enterprise service bus 740 handles communications with the various service endpoints 760. For example, the enterprise service bus 740 can comprise adapters configured to communicate with the various service endpoints 760 (e.g., one adapter per service endpoint). If a new service endpoint is to be supported by the SEE 710, then a new adapter can be created. The enterprise service bus 740 can also transform information sent to, or received from, the various service endpoints 760 into a standard or common format (e.g., so that blended services see a standardized message format when communicating with the various service endpoints 760).

Figure 8:
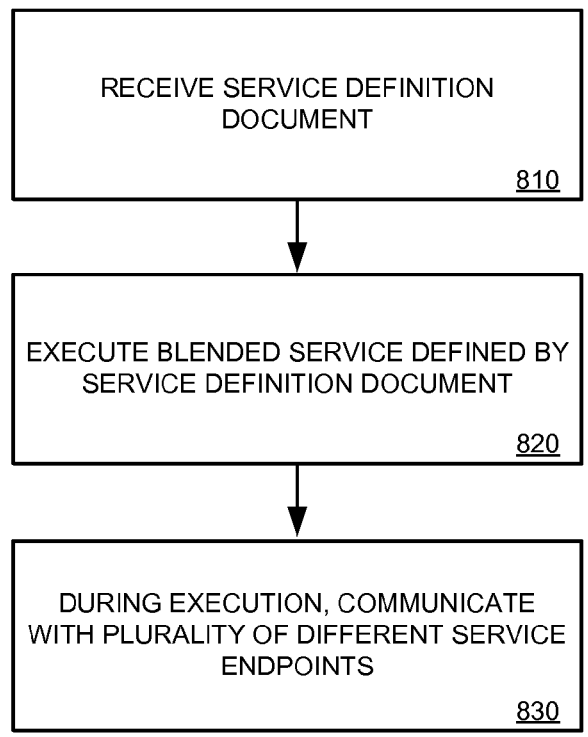
FIG. 8 is a flowchart showing an example method for executing blended services using a service execution environment.

FIG. 8 is a flowchart showing an example method 800 for executing blended services using a service execution environment. At 810, a service definition document defining a blended service is received by a service execution environment.

At 820, the blended service is executed by the service execution environment. The blended service is executed by executing operations as defined by the service definition document. The blended service accesses information from a plurality of service endpoints.

At 830, during execution of the blended service, the service execution environment communicates with a plurality of service endpoints. The blended service uses information from the plurality of service endpoints in providing a composite service to end users.

For example, a blended service can be created that integrates information from a calendaring service endpoint and a location service endpoint. The blended service could obtain appointments from the calendaring service endpoint (provided by a first company or service provider) and obtain a current location of a person or vehicle from the location service endpoint (provided by a second company or service provider). Using these two service endpoints, the blended service can integrate the information and display, to an end user, a map (e.g., obtained from a third service endpoint) showing locations of future appointments in relation to the current location of the person or vehicle.

X. Example Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 9:
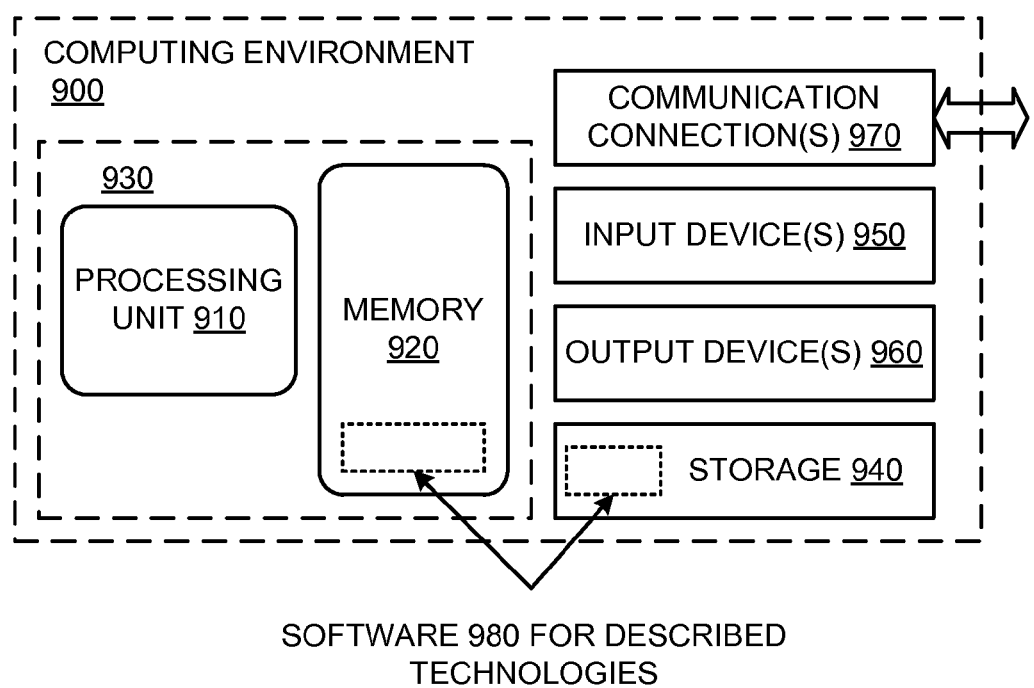
FIG. 9 is a block diagram showing an example computing device.

FIG. 9 illustrates a generalized example of a suitable computing environment 900 in which described embodiments, techniques, and technologies may be implemented. The computing environment 900 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, the computing environment 900 includes at least one central processing unit 910 and memory 920. In FIG. 9, this most basic configuration 930 is included within a dashed line. The central processing unit 910 executes computer-executable instructions. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980 that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other tangible storage medium which can be used to store information and which can be accessed within the computing environment 900. The storage 940 stores instructions for the software 980, which can implement technologies described herein.

The input device(s) 950 may be a touch input device, such as a keyboard, keypad, mouse, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, or other data in a modulated data signal.

XI. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 920 and/or storage 940. As should be readily understood, the term computer-readable media does not include communication connections (e.g., 970) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure. Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. I therefore claim as my invention all that comes within the scope and spirit of these claims.

We claim:

1. A service definition document (SDD) framework, executed by a processing unit, for defining blended service software applications that utilize multiple service endpoints, the SDD framework comprising:
    a first category of the SDD, wherein the first category of the SDD defines a service endpoint representing a blended service, wherein the first category of the SDD defines input parameters and output parameters for the blended service;
    a second category of the SDD, wherein the second category of the SDD defines a plurality of other service endpoints utilized by the blended service, wherein the plurality of other service endpoints comprise a first service provided by a first company and a second service provided by a second company; and
    a third category of the SDD, wherein the third category of the SDD defines execution of the blended service, and wherein the third category of the SDD defines gateways which indicate sequence flow of the blended service, including gateways which define parallel execution of service endpoints, gateways which define joining from parallel execution of service endpoints, and gateways which define synchronous/asynchronous communication with service endpoints.

2. The SDD framework of claim 1, wherein the SDD is defined in an extensible markup language (XML) format.

3. The SDD framework of claim 1, wherein the second category of the SDD defines service access adapters for the plurality of other service endpoints.

4. The SDD framework of claim 1, wherein the blended service is deployed for use by users by executing the SDD using a service execution environment.

5. The SDD framework of claim 1, wherein the blended service is executed as a client-side application.

6. The SDD framework of claim 1, wherein the plurality of service endpoints comprises at least one primary service endpoint and at least one blended service endpoint.

7. The SDD framework of claim 1, wherein the SDD framework supports operation of the blended service according to a state machine model, wherein the state machine model comprises the following components:
    a start component representing start of the blended service;
    a synchronous service component;
    an asynchronous service component;
    a fork state component representing a fork in the blended service;
    a join state component representing a join of a fork in the blended service;
    a timer-wait component for triggering a timer-based event; and
    an end component representing a final state of the blended service.

8. The SDD framework of claim 1,
    wherein the first service provided by the first company is a Get Location service that provides as output a latitude and a longitude;
    wherein the second service provided by the second company is an Email service that provides as output an email message to a user; and
    wherein the blended service is a Location Based Service by Email that utilizes the first service and the second service to send the email message to the user comprising the latitude and longitude.

9. A method, implemented at least in part by a computing device, for defining blended service software applications that utilize multiple service endpoints using a service definition document (SDD) framework, the method comprising:
    creating, using a graphical blended service creation environment, a model of a blended service; and
    saving, using the graphical blended service creation environment, a representation of the model of the blended service as a service definition document (SDD) framework;
    wherein the SDD framework comprises:
        a first category of the SDD, wherein the first category of the SDD defines a service endpoint representing a blended service, wherein the first category of the SDD defines input parameters and output parameters for the blended service;
        a second category of the SDD, wherein the second category of the SDD defines a plurality of other service endpoints utilized by the blended service, wherein the plurality of other service endpoints comprise a first service provided by a first company and a second service provided by a second company; and
        a third category of the SDD, wherein the third category of the SDD defines execution of the blended service, and wherein the third category of the SDD defines gateways which indicate sequence flow of the blended service, including gateways which define parallel execution of service endpoints, gateways which define joining from parallel execution of service endpoints, and gateways which define synchronous/asynchronous communication with service endpoints.

10. The method of claim 9,
wherein the second category of the SDD defines service access adapters for the plurality of other service endpoints.

11. The method of claim 9, wherein the SDD is defined in an extensible markup language (XML) format.

12. The method of claim 9, further comprising:
deploying, using a service execution environment (SEE), the blended service for use by users, wherein the deploying comprises executing the SDD using the SEE.

13. The method of claim 9, wherein the blended service is executed as a client-side application.

14. The method of claim 9, wherein the plurality of service endpoints comprises at least one primary service endpoint and at least one blended service endpoint.

15. A method, implemented at least in part by a service execution environment (SEE) running on a computing device, for executing a blended service using a service definition document (SDD), the method comprising:
receiving, by the SEE, the service definition document, wherein the SDD defines the blended service, wherein the blended service integrates information from a plurality of service endpoints, and wherein the plurality of service endpoints are a plurality of different service endpoints provided by a plurality of different service providers; and
executing, by the SEE, the blended service as defined by the SDD, wherein the executing the blended service comprises:
connecting, by the SEE, to the plurality of service endpoints, wherein the plurality of service endpoints are located remotely, via a communication network, from the SEE;
wherein the SDD is defined by a framework comprising:
a first category of the SDD, wherein the first category of the SDD defines a service endpoint representing a blended service, wherein the first category of the SDD defines input parameters and output parameters for the blended service;
a second category of the SDD, wherein the second category of the SDD defines the plurality of service endpoints utilized by the blended service; and
a third category of the SDD, wherein the third category of the SDD defines execution of the blended service, and wherein the third category of the SDD defines gateways which indicate sequence flow of the blended service, including gateways which define parallel execution of service endpoints, gateways which define joining from parallel execution of service endpoints, and gateways which define synchronous/asynchronous communication with service endpoints.

16. The method of claim 15
wherein the second category of the SDD defines service access adapters for the plurality of service endpoints.

17. The method of claim 15, wherein the SDD is defined in an extensible markup language (XML) format.

18. The method of claim 15, wherein the plurality of service endpoints comprises at least one primary service endpoint and at least one blended service endpoint.

* * * * *